(12) United States Patent
Pompei et al.

(10) Patent No.: US 8,143,338 B1
(45) Date of Patent: Mar. 27, 2012

(54) CEMENT FOR RUBBER AND TIRE FABRICATION

(75) Inventors: Manuela Pompei, Reuler (LU); Philippe Nicolas Joseph Renard, Wiltz (LU); Gilles Hartenstein, Salouel (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/963,666

(22) Filed: Dec. 9, 2010

(51) Int. Cl.
*C08K 5/01* (2006.01)
*C08K 3/04* (2006.01)
(52) U.S. Cl. ........................ 524/474; 524/495
(58) Field of Classification Search .................. 524/474
See application file for complete search history.

(56) References Cited

U.S. PATENT DOCUMENTS

| 4,539,365 | A | * | 9/1985 | Rhee | 152/209.5 |
| 5,901,766 | A | | 5/1999 | Sandstrom et al. | 152/209 R |
| 5,951,797 | A | | 9/1999 | Majumdar et al. | 156/96 |
| 6,620,230 | B1 | * | 9/2003 | Wiethorn et al. | 106/38.22 |
| 6,720,033 | B1 | * | 4/2004 | Sandstrom et al. | 427/385.5 |
| 2009/0159165 | A1 | | 6/2009 | Herberger, Sr. et al. | 152/209.1 |

OTHER PUBLICATIONS

Shell Chemicals, Technical Data Sheet of ShellSol D100S, Nov. 28, 2007.*
ExxonMobil Chemicals, Technical Data Sheet of Isopar M, Oct. 2008.*

* cited by examiner

*Primary Examiner* — Ling Choi
*Assistant Examiner* — Hui Chin
(74) *Attorney, Agent, or Firm* — John D. DeLong

(57) ABSTRACT

The present invention is directed to a cement composition for rubber and tire fabrication, comprising: 100 phr of an elastomer, and from 500 to 4000 phr of an organic solvent having a vapor pressure of less than 0.01 kPa at 20° C.

8 Claims, No Drawings

CEMENT FOR RUBBER AND TIRE FABRICATION

BACKGROUND

Rubber tires are often prepared in a manufacturing process by first building a tire carcass and then building a tire tread thereover. The tire tread is conventionally applied to the tire carcass as a relatively flat, wide, sometimes somewhat contoured, uncured rubber strip which is wound around the carcass with the ends of the uncured rubber strip meeting to form a splice. Tread for retreading is often cut at a 90° angle. The ends of the rubber tread strip for a new tire are usually skived, or cut at an angle other than 90° so that the spliced ends overlap each other. Such procedural constructions are well known to those having skill in such art.

Generally it is desired that the uncured rubber tread strip has a degree of tackiness, sometimes referred to as building tack, so that the tread splice holds together after its construction and is suitable for the subsequent tire cure step. However, the uncured tread strip often does not have sufficient natural building tack for such purpose.

Therefore, an adhesive is often applied to the faces of the opposing surfaces of the tire tread strip splice so that sufficient building tack is present and so that the tread splice can become more securely bonded. For this operation, it is common to apply a solvent based adhesive rubber composition—usually referred to as cement—to one, and sometimes both, faces of the opposing tire tread splice ends.

Examples of various cements for such purpose and tread splices joined by a rubber composition, in general, may be referred to in one or more of U.S. Pat. Nos. 3,335,041; 3,421,565; 3,342,238; 3,514,423; 4,463,120 and 4,539,365. It is readily observed that such exemplary cements are typically based on, for example, solvent solutions of compositions comprised of, for example, a base rubber, hydrocarbon oil, carbon black, tackifier resin and curative.

The tread splice adhesive needs enough cohesive and adhesive strength to hold the tread splice together using only the green tack of the adhesive until curing. Further the circumference of the tire in the tread region can increase slightly in a tire curing press putting a significant strain on the tread splice.

Due to the small adhesion area and large strain potentially applied to a tread splice, adhesives for this application are typically solvent based cements. The solvents increase the molecular mobility of the polymers in the adhesive and increase the wetting of the rubber substrate (e.g., tread ends). Good wetting and molecular mobility promote good adhesion to the substrate. Water based adhesives have replaced rubber cements in some less demanding applications due to their lower volatile organic emissions. The superior performance of solvent based cements often dictates their use, however, so there is a need for cements based on solvents with lower volatile organic emissions.

SUMMARY

The present invention is directed to a cement composition for rubber and tire fabrication, comprising: 100 phr of an elastomer, and from 500 to 4000 phr of an organic solvent having a vapor pressure of less than 0.01 kPa at 20° C.

The invention is also directed to a method of making a pneumatic tire, comprising the step of applying the cement composition to a tire component, and incorporating the tire component into a tire.

The invention is also directed to a tire made by the foregoing method.

DESCRIPTION

There is disclosed a cement composition for rubber and tire fabrication, comprising: 100 phr of a elastomer, and from 500 to 4000 phr of an organic solvent having a vapor pressure of less than 0.01 kPa at 20° C.

The invention is also disclosed a method of making a pneumatic tire, comprising the step of applying the cement composition to a tire component, and incorporating the tire component into a tire.

The invention is also disclosed a tire made by the foregoing method.

Typical prior art formulations for organic solvent based cements are as disclosed for example in U.S. Pat. No. 4,539,365. Such cements generally have a formulation as given in Table 1.

TABLE 1

| Typical Cement Formulation | |
| --- | --- |
| Rubber Compound | Parts by Weight |
| Elastomer | 100 |
| Resins | 10-20 |
| Process Oil | 0-10 |
| Stearic Acid | 1-5 |
| Carbon Black | 30-70 |
| Silica | 0-30 |
| Coupling Agent | 0-5 |
| Zinc Oxide | 1-5 |
| Sulfur | 1-8 |
| Accelerator | 0.5-5 |
| Antioxidant | 0-2 |
| Solvent | 500-4000 |

It has now been found that by using a cement comprising a solvent having a vapor pressure less than 0.01 kPa at 20° C., delamination of a tire components during tire building is substantially reduced or eliminated. Additionally, use of such a cement reduces volatile organic compound (VOC) emissions as compared with more volatile solvents.

The cement composition includes from 500 to 4000 phr of an organic solvent having a vapor pressure less than 0.01 kPa at 20° C. In another embodiment, the cement composition includes from 1000 to 2500 phr of an organic solvent having a vapor pressure less than 0.01 kPa at 20° C. Such vapor pressure may be determined by suitable methods as are known in the art, such as ASTM 323-08 and related ASTM 4953, 5482, 5190, 5191, and 5188, and the like. In one embodiment, the solvent is a hydrotreated middle petroleum distillate having a distillation range of from 230 to 270° C. as measured by ASTM D-86 and the like. Suitable solvents include Finasol VOC from Total.

The cement composition includes rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The cement composition may also include up to 10 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The cement composition may include up to 30 phr of silica.

The commonly employed siliceous pigments which may be used in the cement composition include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Evonik with, for example, designations VN2 and VN3, etc.

Commonly employed carbon blacks can be used in the cement composition in an amount ranging from 30 to 70 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

In one embodiment the cement composition may contain a conventional sulfur containing organosilicon compound. Examples of suitable sulfur containing organosilicon compounds are of the formula:

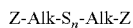

in which Z is selected from the group consisting of

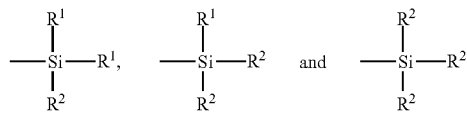

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

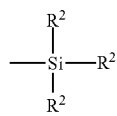

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Evonik.

The amount of the sulfur containing organosilicon compound in a cement composition will vary depending on the level of other additives that are used. Generally speaking, the amount of the compound will range from 0 to 5 phr.

It is readily understood by those having skill in the art that the cement composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, antioxidants and antiozonants. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 1 to 8 phr. Typical amounts of tackifier resins, comprise about 10 to about 20 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, which can include stearic acid comprise about 1 to about 5 phr. Typical amounts of zinc oxide comprise about 1 to about 5 phr.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 5 phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates.

The cement composition includes 10 to 20 phr of a resin selected from the group consisting of hydrocarbon resins, phenol/acetylene resins, rosin derived resins and mixtures thereof.

Representative hydrocarbon resins include coumarone-indene-resins, petroleum resins, terpene polymers and mixtures thereof.

Coumarone-indene resins are commercially available in many forms with melting points ranging from 10 to 160° C. (as measured by the ball-and-ring method). Preferably, the melting point ranges from 30 to 100° C. Coumarone-indene resins are well known. Various analysis indicate that such resins are largely polyindene; however, typically contain random polymeric units derived from methyl indene, coumarone, methyl coumarone, styrene and methyl styrene.

Petroleum resins are commercially available with softening points ranging from 10° C. to 120° C. Preferably, the softening point ranges from 30 to 100° C. Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene.

Terpene polymers are commercially produced from polymerizing a mixture of beta pinene in mineral spirits. The resin is usually supplied in a variety of melting points ranging from 10° C. to 135° C.

Phenol/acetylene resins may be used. Phenol/acetylene resins may be derived by the addition of acetylene to butyl phenol in the presence of zinc naphthlate. Additional examples are derived from alkylphenol and acetylene.

Resins derived from rosin and derivatives may be used in the present invention. Gum and wood rosin have much the same composition, although the amount of the various isomers may vary. They typically contain about 10 percent by weight neutral materials, 53 percent by weight resin acids containing two double bonds, 13 percent by weight of resin acids containing one double bond, 16 percent by weight of completely saturated resin acids and 2 percent of dehydroabietic acid which contains an aromatic ring but no unsaturation. There are also present about 6 percent of oxidized acids. Representative of the diunsaturated acids include abietic acid, levopimaric acid and neoabietic acid. Representative of the monounsaturated acids include dextroplmaris acid and dihydroabietic acid. A representative saturated rosin acid is tetrahydroabietic acid.

The mixing of the cement composition can be accomplished by methods known to those having skill in the rubber mixing art. For example, the ingredients except for the solvent are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 110° C. and 190° C. The appropriate duration of the thermomechanical working varies as a function of the operating conditions, and the volume and nature of the components. For example, the thermomechanical working may be from 1 to 20 minutes. The mixed ingredients may then be dissolved in the solvent to obtain the final cement composition.

The cement composition may be applied to the surface of a tire component using any of the various application methods as are known in the art, including but not limited to spraying, brushing, dipping, and wiping.

The cement composition may be utilized in retreading of a tire, or during tire build of a green tire to join component splices or enhance the tack of any component. The cement composition may then be applied to any tire component, prior to the component being incorporated into a tire. Such components may include retread stock or any components incorporated into a tire during tire building, such as tread, sidewalls, sidewall wedge, runflat insert, carcass, beads, innerliner, apex, chipper, flipper, chafer etc. The cement composition may be applied for various adhesion needs, including but not limited to enhancing green tack, bonding splices, and bonding retread stock to a retread carcass.

Any pneumatic tire may utilize the cement composition of the present invention; such a tire may be a race tire, passenger tire, aircraft tire, agricultural, earthmover, off-the-road, truck tire, and the like. The tire may also be a radial or bias.

The following example is presented in order to illustrate but not limit the present invention. The parts and percentages are by weight unless otherwise noted.

Example

In this example, the adhesive strength (peel strength) between rubber samples prepared with a cement composition is illustrated.

Adhesive (peel) strength of several rubber compounds was tested. Four rubber compounds used in various tire components in off-the-road (OTR) type tires were prepared and tested for peel strength of the rubber compound to itself. Samples were prepared by application of a natural rubber cement composition between two layers of rubber compound. Three sets of samples were prepared, with a control set having no cement applied, a second set having a cement containing a naphtha/isopropanol solvent (solvent A) and the third having a solvent according to the present invention (solvent B). The cements were identical except for the solvents used.

Peel strength testing was done to determine the interfacial adhesion between identical layers of the various rubber formulations that were prepared and then cured together for 32 minutes at 150° C., then aged in air for 5 days at 100° C. The interfacial adhesion between the layers at 100° C. was determined by pulling the first layer away from the other layer at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing. A description may be found in ASTM D4393 except that a sample width of 2.5 cm is used and a clear Mylar plastic film window of a 5 mm width is inserted between the two test samples.

The peel strength results are given in Table 2.

TABLE 2

| Compound Type | Peel Strength, N/mm | | |
|---|---|---|---|
| | No Cement | Solvent A | Solvent B |
| Apex | 1.4 | 3.2 | 2.3 |
| Shoulder Wedge | 4.5 | 6 | 5.6 |
| Sidewall | 30.4 | 29.8 | 28.5 |
| Chafer | 9.5 | 6.3 | 7.5 |

Solvent A=mixture of napththa and isopropanol
Solvent B=hydrotreated middle petroleum distillates with distillation range of 230 to 270° C. and vapor pressure less than 0.01 kPa at 20° C., available as Finasol VOC from Total.

As seen in Table 2, adhesion of the samples was equivalent with the inventive cement as compared with control and prior art cement. It is therefore shown that a solvent with lower volatility (solvent B) can be successfully used to obtain adhesion between rubber components.

While in accordance with the patent statutes the best mode and preferred embodiment has been set forth, the scope of the invention is not limited thereto, but rather by the scope of the attached claims.

What is claimed is:

1. A cement composition for rubber and tire fabrication, comprising: 100 parts by weight of an elastomer, from 500 to 4000 parts by weight, per 100 parts by weight of elastomer (phr) of an organic solvent having a vapor pressure of less than 0.01 kPa at 20° C. wherein the organic solvent comprises hydrotreated middle petroleum distillates having a distillation range of from 230 to 270° C.; and
   at least one curative selected from the group consisting of sulfur and cure accelerators.

2. The cement composition of claim 1, wherein the elastomer is selected from the group consisting of polyisoprene (natural or synthetic), polybutadiene and SBR.

3. The cement composition of claim 1, further comprising from 10 to 20 phr of a resin selected from the group consisting of hydrocarbon resins, phenol/acetylene resins, rosin derived resins and mixtures thereof.

4. The cement composition of claim 1, further comprising from 30 to 70 phr of carbon black.

5. The cement composition of claim 1, further comprising at least one additive selected from the group consisting of zinc oxide and stearic acid.

6. The cement composition of claim 1, wherein the organic solvent is present in an amount ranging from 1000 to 2500 phr.

7. A method of making a pneumatic tire, comprising the step of
applying a cement composition to a tire component; and
incorporating the tire component into a tire;
wherein the cement composition comprises: 100 parts by weight of an elastomer, from 1000 to 2500 parts by weight, per 100 parts by weight of elastomer (phr) of an organic solvent having a vapor pressure of less than 0.01 kPa at 20° C. wherein the organic solvent comprises hydrotreated middle petroleum distillates having a distillation range of from 230 to 270° C.; and
at least one curative selected from the group consisting of sulfur and cure accelerators.

8. A tire made by the method of claim 7.

* * * * *